(12) United States Patent
Salama et al.

(10) Patent No.: US 7,460,518 B1
(45) Date of Patent: Dec. 2, 2008

(54) DEVICES, SOFTWARES AND METHODS FOR RULE BASED DETERMINATION OF ATTRIBUTES OF CALLED DEVICE FOR NETWORK TELEPHONE CALL SETUP

(75) Inventors: Hussein Salama, Sunnyvale, CA (US); Francois Le Faucheur, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 1037 days.

(21) Appl. No.: 09/944,481

(22) Filed: Aug. 31, 2001

(51) Int. Cl.
*H04L 12/66* (2006.01)

(52) U.S. Cl. ........................ 370/352; 370/465

(58) Field of Classification Search ............... None
See application file for complete search history.

(56) References Cited

U.S. PATENT DOCUMENTS

| | | | |
|---|---|---|---|
| 6,130,879 A * | 10/2000 | Liu | 370/230 |
| 6,339,481 B1 * | 1/2002 | Scott | 358/442 |
| 6,940,819 B2 * | 9/2005 | Kato | 370/237 |
| 6,978,383 B2 * | 12/2005 | Boyle et al. | 726/15 |
| 7,082,133 B1 * | 7/2006 | Lor et al. | 370/392 |
| 2001/0033577 A1 * | 10/2001 | Tang | 370/442 |
| 2002/0015181 A1 * | 2/2002 | Murata et al. | 358/1.15 |
| 2003/0235187 A1 * | 12/2003 | Iwama et al. | 370/352 |

* cited by examiner

*Primary Examiner*—Firmin Backer
*Assistant Examiner*—Rhonda Murphy
(74) *Attorney, Agent, or Firm*—Stolowitz Ford Cowger LLP (57) ABSTRACT

Devices, softwares and methods can establish an IP connection with each other through a network. Dynamic connection attributes of the called device are inferred locally by the calling device. These may include any one or more of type of codec, bandwidth, port number, and so on. A rule may be used for inference, expecting that the called device uses the same rule. Setup takes place without the calling device receiving this information explicitly by signaling. Plus setup may take place even though expected handshake signals might not be transmitted at all, due to differences in implementation, or even a difference in protocols.

52 Claims, 4 Drawing Sheets

DEVICES, SOFTWARES AND METHODS FOR RULE BASED DETERMINATION OF ATTRIBUTES OF CALLED DEVICE FOR NETWORK TELEPHONE CALL SETUP

BACKGROUND OF THE INVENTION

1. Field of the Invention

The present invention is related to the field of network telephony, and more specifically to devices, softwares and methods for accelerating the setup of a network telephone call.

2. Description of the Related Art

Networks such as the internet are increasingly used for telephony. Prior to actually speaking on the telephone, the end devices are engaged in setting up the telephone call. The process of setting up takes place by exchanging signals, as dictated by an appropriate protocol.

More generally, a number of applications run above the Internet Protocol (IP) layer. Such applications include multimedia applications, as for example Voice over IP (VoIP). Network telephony takes place under VoIP.

Each telephone call is made by two complementary voice streams between the two end devices. Admission control for such applications is supported through the use of RSVP signaling and RSVP admission control. For example, setting up the call could involve setting up two RSVP sessions, i.e., one RSVP session for each of the two voice streams. "RSVP" stands for "Resource Reservation Protocol", and is also known as "Resource Reservation Setup Protocol". It is a protocol that supports the reservation of resources across an IP network. Applications running on IP end systems can use RSVP to indicate to other nodes the specification of the packet streams they want to receive. The specification involves bandwidth, jitter, maximum burst, port number, and so forth of the packets.

RSVP signaling takes place during application session establishment, which in the case of VoIP is during call setup. RSVP signaling must be synchronized with the application session establishment phase, which in the case of VoIP is with Voice signaling call flow. This is necessary to ensure compatible behavior from the end user.

This must take place fast. In the case of VoIP, RSVP signaling must happen early enough in the VoIP signaling call flow, so that RSVP admission control can take place before the telephone of the called party rings. To constrain matters even more, since RSVP is unidirectional, it must be initiated by each one of the two parties to the prospective exchange. But RSVP signaling can only take place once sufficient information about the session is known to each side about the other.

Two examples of this type of information that needs to become known are now discussed.

First, in the particular case of the International Telecommunications Standard (ITU) as H.323 version 3, section ITU-T SG16 specifies one approach for synchronizing RSVP signaling with H.323 signaling. This approach has the purpose of, among others, negotiating the required level of Quality of Service (QoS). For this purpose, the called party is required to convey to the calling party some information before the caller can initiate RSVP signaling. The information is conveyed through H.323 signaling messages, and relates to a number of attributes for the session associated by the called party.

The H.323 signaling messages have at least two fields. A first field is sometimes called QoScapabilities, and includes the bandwidth, the burst size, etc. A second field is sometimes called OpenLogicalChannel field, and includes a subfield called the H2250LogicalChannelParameters. The latter includes the port numbers used.

Figure 1:
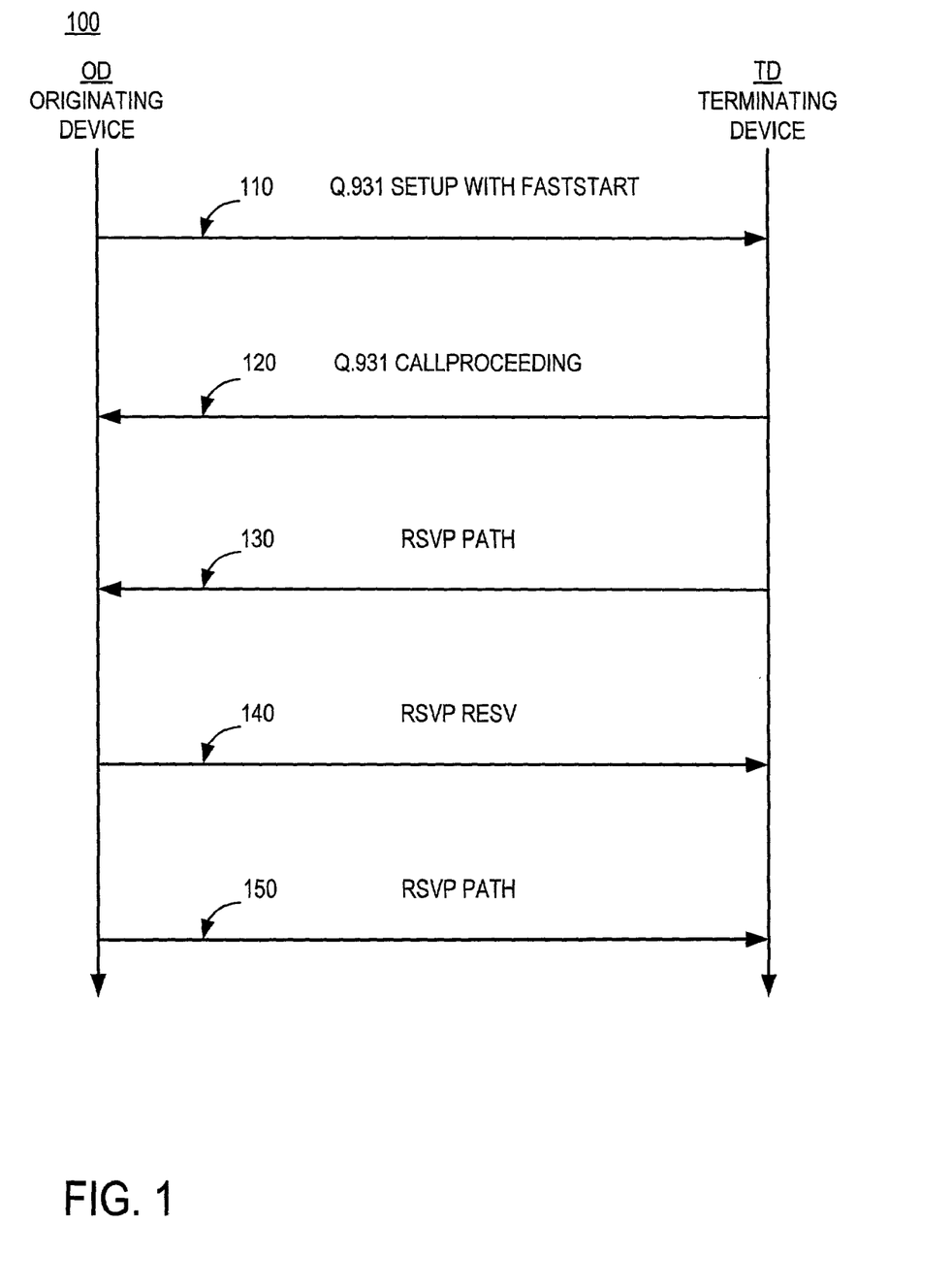
FIG. 1 is a prior art signaling sequence of devices setting up a network connection between them.

Referring to FIG. 1, a signaling sequence 100 shows salient portions of ITU Standard H.323. Sequence 100 may be used for exchanging messages (also known as signals) that contain such information.

In FIG. 1, an originating device OD calls a terminating device TD by sending a message 110. Message 110 is also known as Q.931 Setup with fastStart.

Terminating Device TD then responds with messages 120 and 130. Message 120 is also known as Q.931 CallProceeding with fastStart, and includes information as to how device TD is to be accessed. Message 130 is also known as RSVP Path, and includes information as to how device TD will be accessing.

Originating Device OD then has enough information to initiate the RSVP session. Device OD then responds with messages 140 and 150. Message 140 is also known as an RSVP Resv (reservation) signal. Message 150 is also known as RSVP Path, and is reciprocal to message 130.

The second example is with the relatively new, so-called Session Initiation Protocol (SIP). Under SIP there is a QoS precondition establishment, where the called party has to convey information to the calling party. This is conveyed by an SIP signaling message under 183 Session Progress. The message includes an SDP which contains information on the session attributes necessary for the calling party to initiate the RSVP session with the called party.

A complexity is with the H.323 CallProceeding message and the equivalent SIP 183 message. They are both optional and many vendors might not implement them in the first place. Because they constitute additional steps in the call flow and thus increase call establishment time, these signaling messages may need to be avoided in some environments which require very fast call establishment. Yet other application protocols might not include at all an equivalent of the CallProceeding message. Then the attributes do not become known, or other arrangements are necessary.

BRIEF SUMMARY OF THE INVENTION

The present invention overcomes these problems and limitations of the prior art.

Generally, the present invention provides devices, softwares and methods that can establish an IP connection with each other through a network. According to the invention, dynamic connection attributes of the called device are inferred locally by the calling device. These may include any one or more of type of codec, bandwidth, port number, and so on.

The invention offers the advantage that call setup is thus faster. This is because the calling device need not wait to receive this information explicitly by signaling. Even more, an advantageous call setup may take place even between devices, applications and protocols do not include a H.323 CallProceeding message or its equivalent.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods that can establish an IP connection with each other. The invention is now described in more detail.

Figure 2:
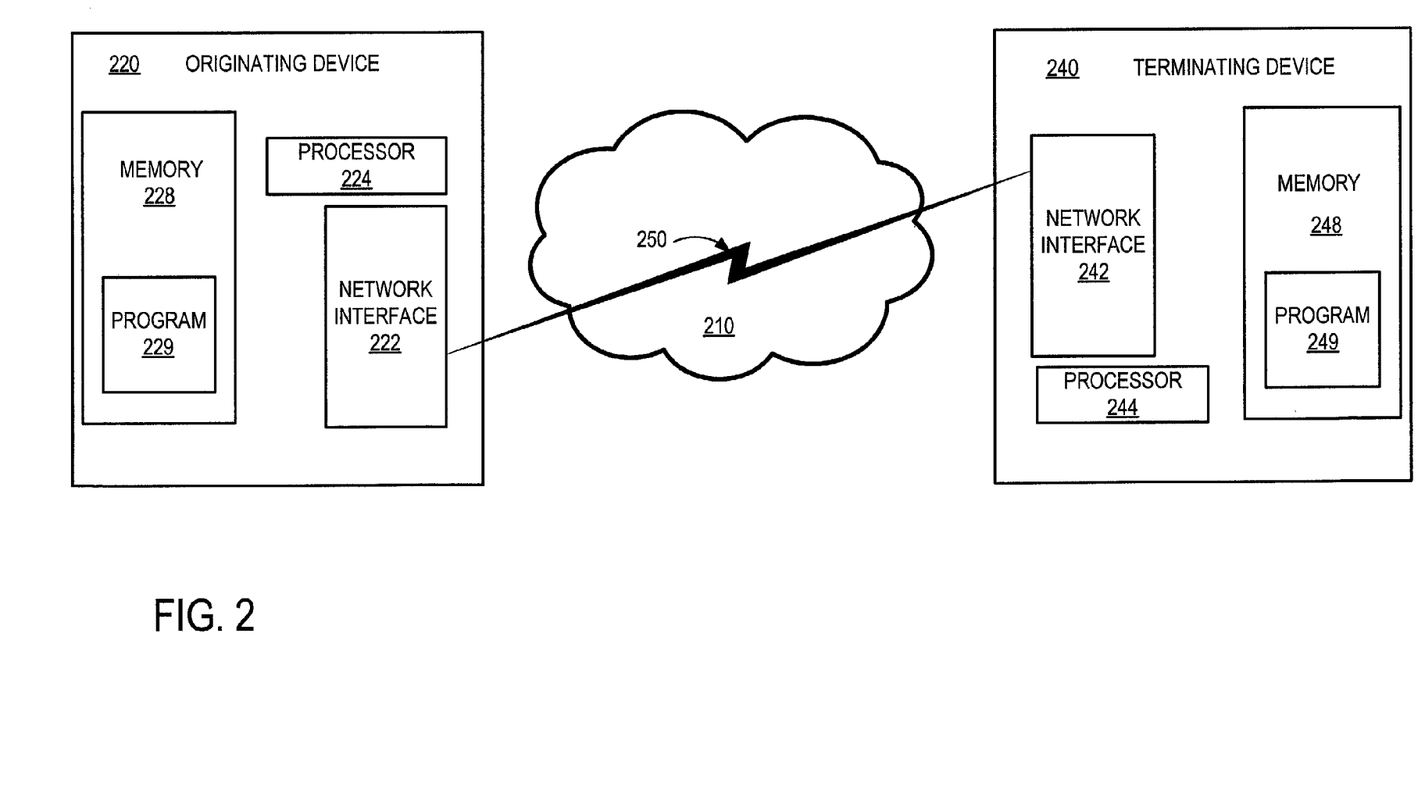
FIG. 2 is a diagram of two devices made according to embodiments of the invention, and setting up a network connection between them according to an embodiment of the invention.

Referring now to FIG. 2, a network 210 separates devices 220, 240 which are made according to embodiments of the invention. These devices may establish a network connection 250. For the example of FIG. 2, device 220 is the calling device, which is also known as the originating device, because it is the device that originates the telephone call. Equally, device 240 is the called device, which is also called the terminating device, because it is the device where the telephone call terminates.

Devices 220, 240 may be any type of network switch that can accommodate VoIP and other applications that run above the IP layer. For example, devices 220, 240 may be voice gateways or end devices, such as IP telephones.

Switch 220 has a network interface 222, and switch 240 has a network interface 242. Interfaces 222, 242 are for interfacing with a network, such as network 210.

Switch 220 also has a processor 224 coupled with network interface 222. Switch 240 has a processor 244 coupled with network interface 242. Processors 224, 244 may be implemented as a Digital Signal Processors (DSPs), Central Processing Units (CPUs), or any other equivalent way known in the art.

Switch 220 additionally includes a memory 228, on which a program 229 may reside. Functions of processor 224 may be controlled by program 229, as will become apparent from the below.

Switch 240 moreover includes a memory 248, on which a program 249 may reside. Functions of processor 244 may be controlled by program 249, as will become apparent from the below.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Continuing to refer to FIG. 2, connection 250 is set up according to the invention. That is, at least one dynamic attribute of the terminating device is inferred by the originating device, instead of being learned explicitly by a received signal.

Inferring is based on rules, which may even become protocols. The invention will not work if the devices do not follow the same rule. Sensible rules are preferably chosen, which increases the likelihood that there will be a match of the rules, and that therefore the invention will work.

Methods of the invention are now described.

Figure 3:
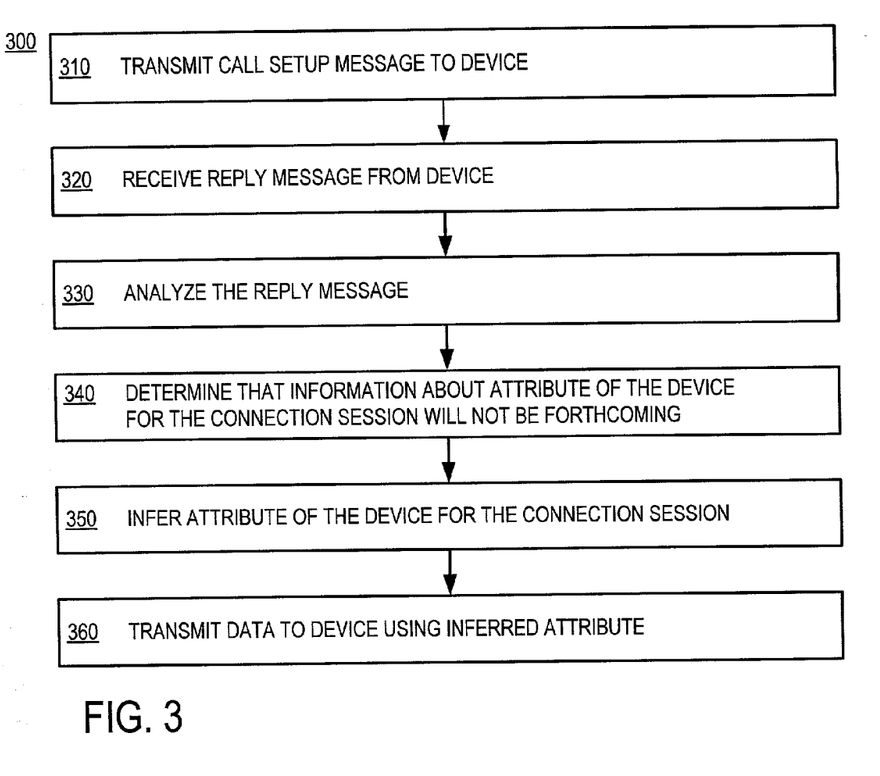
FIG. 3 is a flowchart illustrating a method according to an embodiment of the present invention.

Referring now to FIG. 3, a flowchart 300 is used to illustrate a method according to an embodiment of the invention. The method of flowchart 300 may also be practiced by a calling device, such as device 220 of FIG. 2.

According to a box 310, a call setup message is transmitted to another device, such as to device 240 of FIG. 2. The call setup message may be an H.323 version 3 fastStart type message, although that is not necessary for practicing the invention.

According to a next box 320, a reply message is received from the other device. The reply message is received in response to the call setup message.

According to a next box 330, the reply message is analyzed. Its content therefore becomes known. The reply message may include an identifying number of a port that the other device will be using to transmit data from. The reply message may be an RSVP Path type message, although that is not necessary for practicing the invention.

According to a next box 340, it is determined from analyzing the reply message that at least some of the information is not included in the reply message, and moreover it is decided that the missing information will not be forthcoming. That information is about a dynamic attribute of the device for the connection session.

Deciding may be performed by determining that the reply message was received before information about the attribute was received, even though a protocol might dictate so. For example, if the reply message is an RSVP Path type message, it should have been received after a Q.931 CallProceeding message 120, as per the protocol of FIG. 1. But since that did not happen, it may be decided that message 120 will not be coming at all. In this case, the missing information includes which port the other device will use to receive data from.

Deciding that the information will not be forthcoming is advantageously interpreted according to the invention as an invitation to a faster connection.

According to a next box 350, the attribute of the device is inferred. Inferring is based on a rule, assuming the other device uses the same rule. This corresponds to accepting the invitation.

Any one or more attributes may be inferred according to the invention. For example, the inferred attribute is a codec type of the device. Or the inferred attribute is a maximum bandwidth that the device may receive data in.

In the case where message 120 is missing, the inferred attribute may be about the port number that will be used by the device to receive data from. For example, if the reply message includes an identifying number of a port that the device will be using to transmit data from, and the inferred attribute may be the port number that will be used by the device to receive data from. It may be inferred as a function of the identified port number, for example either the same port, or one derived by a preset operation. An example of such a preset operation may be to add a preset number (e.g. the number 2) to the identified port number.

According to a next box 360, data is transmitted to the other device, using the inferred attribute. The data may be audio packets, once the connection is established. For example, the audio packets may be addressed to the number of the port of the other device that was inferred to receive data.

It will be appreciated by a person skilled in the art that there are more steps between box 350 and box 360, and also possibly between other boxes. These are not repeated here so as not to obscure unnecessarily the present description.

Figure 4:
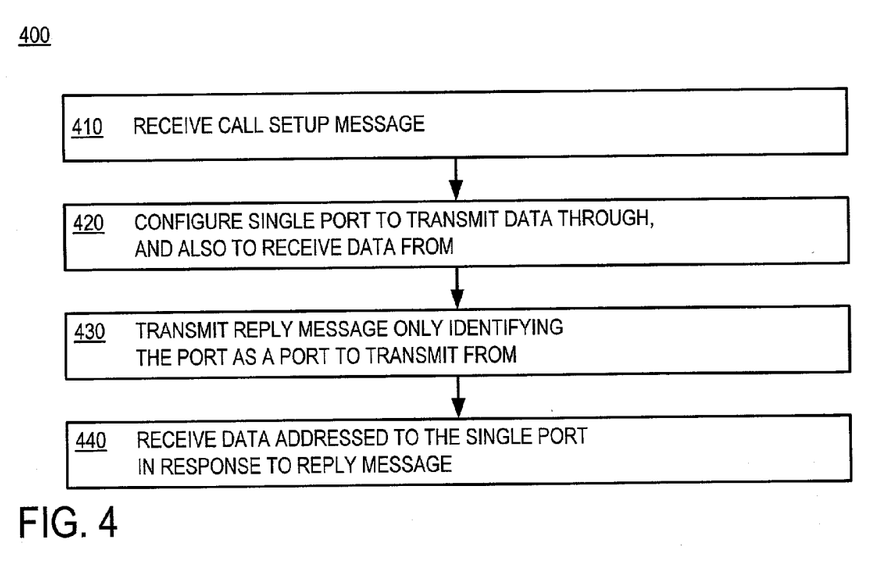
FIG. 4 is a flowchart illustrating a method according to another embodiment of the present invention.

Referring now to FIG. 4, a flowchart 400 is used to illustrate a method according to another embodiment of the invention. The method of flowchart 400 may also be practiced by a called device, such as device 240 of FIG. 2.

According to a box 410, a call setup message is received from another device, such as device 220 of FIG. 2. The call setup message may be an H.323 version 3 fastStart type message, although that is not necessary for practicing the invention.

According to a next box 420, a single one of the ports is configured to transmit data through, and also to receive data from.

According to a next box 430, a reply message may be transmitted to the other device. The reply message need only identify the port as a port to transmit data through. According to the invention, the reply message need not also identify the port as a port to receive data from. This is performed in the hope that the other device will infer, by using the suggested rule that the same port be used for transmitting and receiving. In that way, the abbreviated reply is an invitation to the calling device for a faster connection.

As an example, if the call setup message is an H.323 version 3 fastStart type message, the reply message may simply be an RSVP Path type message. As a result, no different type of signaling will be necessitated to implement the invention.

According to a next box 440, data is received, such as audio packets. The received data is addressed to the single port in response to the reply message. That is because the other device has made the desired inference.

It will be appreciated that the invention may be practiced with any number of connection protocols that work for an RSVP session, or a session equivalent to an RSVP session. In other words, the invention is not limited to the H.323 and SIP protocols that are described herein.

In both cases, the invention may be implemented by leveraging the RSVP/application API extensions. Another advantage of this invention is that it does not require that the standard signaling protocols be changed. The RSVP API must support the following functions:

Path Listen: an application can listen to incoming Path events for a given session (a session is identified by destination IP address, destination port, and protocol ID). The API should provide the application with information about the sender (sender IP address and sender port).

Resv Listen: an application can listen to incoming Resv events for a given session.

In addition, the API should enable the application to listen to ResvConf and ResvErr events for a given session.

It will be appreciated by a person skilled in the art that there are more steps between box 430 and box 440, and also possibly elsewhere in this description. These are not repeated here so as not to obscure unnecessarily the present description.

Figure 5:
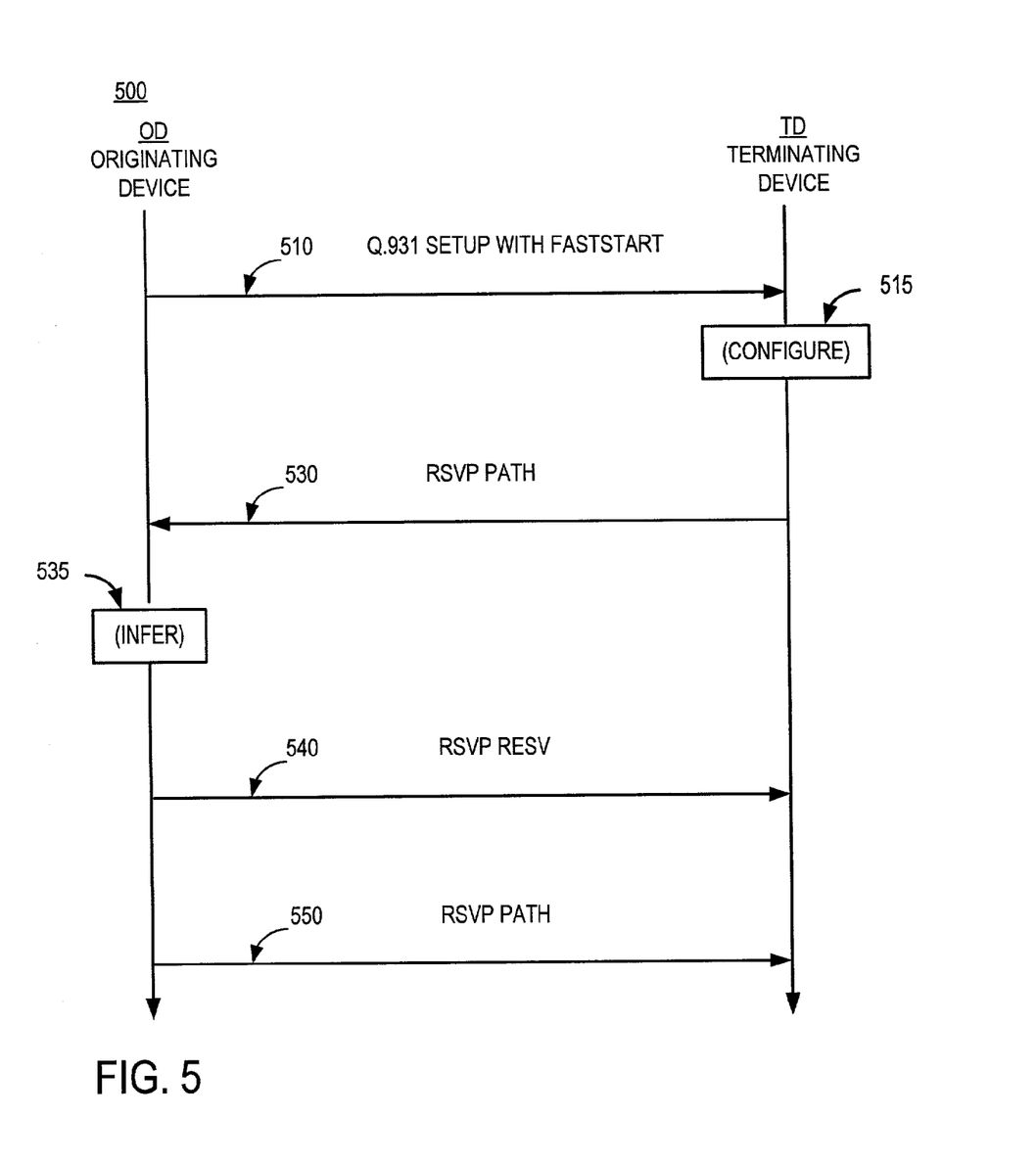
FIG. 5 is a signaling sequence according to an embodiment of the invention for synchronizing a H.323 fastStart signaling with RSVP signaling.

Referring now to FIG. 5, an example of a signaling sequence is given for the arrangement of FIG. 2, using H.323 signaling. Elements of the sequence have already been described in connection with FIG. 3 and FIG. 4. The person skilled in the art will appreciate that the signaling will be similar for other protocols, such as SIP.

Initially, device OD only knows its own IP address and UDP voice port for the call being established. It starts listening for RSVP messages for the session. It does that with (dest. IP=OD, dest. Port=OD's LDP port, protocol ID=UDP). By "dest." it is meant "destination".

Then device OD sends Q.931 Setup message 510 to device TD. It includes its IP address and UDP port number in the fastStart field. This message 510 may be the same as message 110 of FIG. 1.

Then, device TD receives the Setup message from device OD. Device TD thus learns the OD's IP address and port number.

Then according to box 515, device TD applies the rules to assign a UDP port for this call. It now has all the information necessary to start the RSVP signaling. The port will be for both transmitting and receiving data.

Then device TD starts listening for RSVP messages for the session. It listens for messages with (dest. IP=TD, dest. Port=TD's UDP port, protocol ID=UDP).

Then device TD sends to the OD an RSVP Path message 530 for the stream from TD to OD, i.e. the session with (dest. IP=OD, dest. Port=OD's UDP port, protocol ID=UDP).

Then device OD receives the Path message 530. From the Path message, it learns TD IP address and UDP port number.

Then according to box 535, device OD infers that device TD will be using the same port for both transmitting and receiving data.

Then device OD sends a RSVP Resv message 540 in response to the received RSVP Path message 530. It can also send a Path message 550 for the stream from OD to TD, i.e. the session (dest. IP=TD, dest. Port=TD's UDP port, protocol ID=UDP). This is received by device TD.

To complete the handshake, device TD responds by sending a Resv request for the stream from OD to TD. Then device TD also receives the Resv message for the stream from TD to OD. The reservation for the stream from TD to OD is now complete. An RSVP RevConf message may be this sent in response to the received Resv message, but this is optional.

Then device OD receives the Resv message for the stream from OD to TD. The reservation for the stream from OD to TD is now complete. Then device OD must send a ResvConf message to TD.

When device TD receives the ResvConf, if it has already received the Rev message for TD to OD, it knows the reservation process has been completed for streams in both directions. The Q.931 call setup signaling can resume.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
a network interface for coupling to a network; and
a processor coupled with the network interface, wherein the processor is configured to:
transmit a call setup message to a called device through a network to establish a connection session for exchanging data;
receive from the called device a reply message, wherein the reply message is transmitted to the device through the network;
analyzes the reply message for inclusion of an attribute of the called device associated with the connection session;
infer from the reply message an attribute that is not included in the reply message; and
transmit data to the called device using the inferred attribute.

2. The device of claim 1, where
the inferred attribute is a codec type of the device or a maximum allowable jitter or burst size associated with data that may be received by the called device.

3. The device of claim 1, where the inferred attribute is a maximum bandwidth that the called device may receive data in.

4. The device of claim 1, where:
the call setup message is an H.323 version 3 fastStart type message; and
the reply message is an RSVP Path type message.

5. A device comprising:
a network interface for coupling to a network; and
a processor coupled with the network interface, wherein where the processor is configured to:
transmit a call setup message to a called device through a network to establish a connection session for exchanging data;
receive from the called device a reply message;
analyze the reply message;
infer from the reply message attribute of the called device for the connection session that is not included in the reply message; and
transmit data to the called device using the inferred attribute, where
the reply message includes an identifying number of a port that the called device will be using to transmit data from, and
the inferred attribute is the port number that will be used by the called device to receive data from, inferred as a function of the identified port number.

6. The device of claim 5, wherein where the inferred port number is the same as the identified port number.

7. A device comprising:
a network interface for coupling to a network; and
a processor coupled with the network interface, where the processor is configured to:
transmit a call setup message to a called device through a network to establish a connection session for exchanging data;
receive from the device a reply message;
analyze the reply message;
infer from the reply message an attribute of the called device for the connection session that is not included in the reply message;
transmit data to the device using the inferred attribute; and
decide that information about the attribute will not be forthcoming after transmitting the call setup message and prior to inferring the attribute.

8. The device of claim 7, where
deciding is performed by determining that the reply message was received before information about the attribute was received.

9. The device of claim 7, where
the call setup message is an H.323 version 3 fastStart type message; and
the reply message is an RSVP Path type message.

10. A device comprising:
a network interface for coupling to a network; and
a processor coupled with the network interface, where the processor is configured to:
receive a call setup message from a calling device through a network to establish a connection for exchanging data;
configure a first port to transmit data through during the connection;
configure a second port to receive data from, during the connection;
transmit to the calling device a reply message identifying the first port as a port to transmit from, but not identifying the second port; and
receive data addressed to the second port in response to the reply message, where the calling device infers from the reply message an identity of the second port.

11. The device of claim 10, where:
the call setup message is an H.323 version of 3 fastStart type message; and
the reply message is an RSVP Path type message.

12. A device comprising:
a network interface for coupling to a network; and
a processor coupled with the network interface, where the processor is configured to:
receive a call setup message from a calling device through a network to establish a connection for exchanging data;
configure a first port to transmit data through, during the connection;
configure a second port to receive data from, during the connection, wherein the second port is a different port than the first port;
transmit to the calling device a reply message identifying the first port as a port to transmit from, but not identify the second port; and
receive data addressed to the second port in response to the reply message, where an identifying number of the second port has a preset relationship with an identifying number of the first port.

13. A device comprising:
means for transmitting a call setup message to a called device through a network to establish a connection session for exchanging data;
means for receiving from the called device a reply message;
means for analyzing the reply message for inclusion of an attribute of the called device associated with the connection session;
means for inferring from the reply message the attribute that is not included in the reply message;
means for transmitting data to the called device using the inferred attributes; and
means for deciding that information about the attribute will not be forthcoming after transmitting the call setup message and prior to inferring the attribute.

14. The device of claim 13, where
the inferred attribute is a codec type of the called device or a maximum allowable jitter or burst size associated with data that may be received by the called device.

15. The device of claim 13, where
the inferred attribute is a maximum bandwidth that the device may receive data in.

16. The device of claim 13, wherein
the call setup message is an H.323 version 3 fastStart type message; and
the reply message is an RSVP Path type message.

17. A device comprising:
means for transmitting a call setup message to a device through a network to establish a connection session for exchanging data;
means for receiving from the device a reply message;
means for analyzing the reply message;
means for inferring from the reply message an attribute of the device for the connection session that is not included in the reply message; and
means for transmitting data to the device using the inferred attribute, where
the reply message includes an identifying number of a port that the device will be using to transmit data from, and
the inferred attribute is the port number that will be used by the device to receive data from, inferred as a function of the identified port number.

18. The device of claim 17, where the inferred port number is the same as the identified port number.

19. A device comprising:
means for transmitting a call setup message to a device through a network to establish a connection session for exchanging data;
means for receiving from the device a reply message;
means for analyzing the reply message;
means for inferring from the reply message an attribute of the device for the connection session that is not included in the reply message;
means for transmitting data to the device using the inferred attribute; and
means for deciding that information about the attribute will not be forthcoming after transmitting the call setup message and prior to inferring the attribute.

20. The device of claim 19, wherein
deciding is performed by determining that the reply message was received before information about the attribute was received.

21. The device of claim 19, wherein
the call setup message is an H.323 version 3 fastStart type message; and
the reply message is an RSVP Path type message.

22. A device comprising:
means for receiving a call setup message from a device through a network to establish a connection for exchanging data;

means to configure a first port to transmit data through, during the connection;
means to configure a second port to receive data from, during the connection;
means to transmit to the calling device a reply message identifying the first port as a port to transmit from, but not identifying the second port;
means to infer from the reply message an identity of the second port, and
means to receive data addressed to the second port in response to the reply message.

23. The device of claim 22, where:
the call setup message is an H.323 version 3 fastStart type message; and
the reply message is an RSVP Path type message.

24. A device comprising:
means for receiving a call setup message from a device through a network to establish a connection for exchanging data;
means to configure a first port to transmit data through, during the connection;
means to configure a second port to receive data from, during the connection;
means to transmit to the device a reply message identifying the first port as a port to transmit from, but not identifying the second port; and
means to receive data addressed to the second port in response to the reply message, wherein where an identifying number of the second port has a preset relationship with an identifying number of the first port.

25. The device of claim 24, where
the identifying number of the second port equals the identifying number of the first port.

26. The device of claim 24 wherein the device is a calling device configured to communicate with the called device through the network.

27. An article comprising: a computer-readable medium, having instructions stored thereon, and when the instructions are executed by at least one device, they result in:
transmitting a call setup message to a called device through a network to establish a connection session for exchanging data;
receiving from the device a reply message;
analyzing the reply message for inclusion of an attribute of the called device associated with the connection section;
inferring from the reply message an attribute that is not included in the reply message;
transmitting data to the device using the inferred attribute; and
deciding that information about the attribute will not be forthcoming after transmitting the call setup message and prior to inferring the attribute.

28. The article of claim 27, where
the inferred attribute is a codec type of the device or a maximum allowable jitter or burst size associated with data that may be received by the called device.

29. The article of claim 27, where
the inferred attribute is a maximum bandwidth that the device may receive data in.

30. The article of claim 27, where:
the call setup message is an H.323 version 3 fastStart type message; and
the reply message is an RSVP Path type message.

31. An article comprising: a computer-readable medium having instructions stored thereon, and when the instructions are executed by at least one device, they result in:
transmitting a call setup message to a called device through a network to establish a connection session for exchanging data;
receiving from the called device a reply message;
analyzing the reply message;
inferring from the reply message an attribute of the called device for the connection session that is not included in the reply message;
transmitting data to the device using the inferred attribute, where
the reply message includes an identifying number of a port that the called device will be using to transmit data from, and
the inferred attribute is the port number that will be used by the called device to receive data from, inferred as a function of the identified port number.

32. The article of claim 31, where
the inferred port number is the same as the identified port number.

33. An article comprising: a computer-readable medium having instructions stored thereon, and when the instructions are executed by at least one device, they result in:
transmitting a call setup message to a called device through a network to establish a connection session for exchanging data;
receiving from the called device a reply message;
analyzing the reply message;
inferring from the reply message an attribute of the called device for the connection session that is not included in the reply message;
transmitting data to the device using the inferred attribute; and
deciding that information about the attribute will not be forthcoming after transmitting the call setup message and prior to inferring the attribute.

34. The article of claim 33, where
deciding is performed by determining that the reply message was received before information about the attribute was received.

35. The article of claim 33, where:
the call setup message is an H.323 version 3 fastStart type message; and
the reply message is an RSVP Path type message.

36. An article comprising: a computer-readable medium, having instructions stored thereon, wherein when the instructions are executed by at least one device, they result in:
receiving a call setup message from a calling device through a network to establish a connection for exchanging data;
configuring a first port to transmit data through, during the connection;
configuring a second port to receive data from, during the connection;
transmitting to the calling device a reply message identifying the first port as a port to transmit from, but not identifying the second port;
inferring from the reply message an-identify identity of the second port and
receiving data addressed to the second port in response to the reply message.

37. The article of claim 36, where:
the call setup message is an H-323 version 3 faststart type message; and
the reply message is an RSVP Path type message.

38. An article comprising: a computer-readable medium, having instructions stored thereon, and when the instructions are executed by at least one device, they result in:

receiving a call setup message from a device through a network to establish a connection for exchanging data;
configuring a first port to transmit data through during the connection;
configuring a second port to receive data from, during the connection;
transmitting to the device a reply message identifying the first port as a port to transmit from, but not identifying the second port; and
receiving data addressed to the second port in response to the reply message, where an identifying number of the second port has a preset relationship with an identifying number of the first port.

39. The article of claim 38, where
the identifying number of the second port equals the identifying number of the first port.

40. A method comprising:
transmitting a call setup message to a device through a network to establish a connection session for exchanging data;
receiving from the device a reply message;
analyzing the reply message for inclusion of an attribute of the device associated with the connection session;
inferring from the reply message the attribute that is not included in the reply message;
transmitting data to the device using the inferred attribute; and
deciding that information about the attribute will not be forthcoming after transmitting the call setup message and prior to inferring the attribute.

41. The method of claim 40, where
the inferred attribute is a codec type of the device or a maximum allowable jitter or burst size associated with data that may be received by the device.

42. The method of claim 40, where
the inferred attribute is a maximum bandwidth that the device may receive data in.

43. The method of claim 40, where
the call setup message is an H.323 version 3 fastStart type message; and
the reply message is an RSVP Path type message.

44. A method comprising:
transmitting a call setup message to a device through a network to establish a connection session for exchanging data;
receiving from the device a reply message;
analyzing the reply message;
inferring from the reply message an attribute of the device for the connection session that is not included in the reply message; and
transmitting data to the device using the inferred attribute, where
the reply message includes an identifying number of a port that the device will be using to transmit data from, and
the inferred attribute is the port number that will be used by the device to receive data from, inferred as a function of the identified port number.

45. The method of claim 44, wherein where
the inferred port number is the same as the identified port number.

46. A method comprising:
transmitting a call setup message to a device through a network to establish a connection session for exchanging data;
receiving from the device a reply message;
analyzing the reply message;
inferring from the reply message an attribute of the device for the connection session that is not included in the reply message;
transmitting data to the device using the inferred attribute; and
deciding that information about the attribute will not be forthcoming after transmitting the call setup message and prior to inferring the attribute.

47. The method of claim 46, where
deciding is performed by determining that the reply message was received before information about the attribute was received.

48. The method of claim 46, where:
the call setup message is an H.323 version 3 fastStart type message; and
the reply message is an RSVP Path type message.

49. A method comprising:
receiving a call setup message from a device through a network to establish a connection for exchanging data;
configuring a first port to transmit data through, during the connection;
configuring a second port to receive data from, during the connection;
transmitting to the device a reply message identifying the first port as a port to transmit from, but not identifying the second port;
inferring from the reply message identity of the second port; and
receiving data addressed to the second port in response to the reply message.

50. The method of claim 49, where:
the call setup message is an H.323 version 3 fastStart type message; and
the reply message is an RSVP Path type message.

51. A method comprising:
receiving a call setup message from a calling device through a network to establish a connection for exchanging data;
configuring a first port of a called device to transmit data through, during the connection;
configuring a second port of the called device to receive data from, during the connection;
transmitting to the calling device a reply message identifying the first port as a port to transmit from, but not identifying the second port; and
receiving data addressed to the second port in response to the reply message, where an identifying number of the second port has a preset relationship with an identifying number of the first port.

52. The method of claim 51, where
the identifying number of the second port equals the identifying number of the first port.

* * * * *

UNITED STATES PATENT AND TRADEMARK OFFICE
CERTIFICATE OF CORRECTION

| | |
|---|---|
| PATENT NO. | : 7,460,518 B1 |
| APPLICATION NO. | : 09/944481 |
| DATED | : December 2, 2008 |
| INVENTOR(S) | : Hussein Salama |

It is certified that error appears in the above-identified patent and that said Letters Patent is hereby corrected as shown below:

At column 8, line 20 of Claim 1, please delete "wherein" and insert -- where --, therefor.

At column 8, line 28 of Claim 1, please delete "analyzes" and insert -- analyze --, therefor.

At column 8, line 30 of Claim 1, please delete "an" and insert -- the --, therefor.

At column 8, line 35 of Claim 2, please delete "the" and insert -- the called --, therefor.

At column 8, lines 47-48 of Claim 5, please delete "wherein where" and insert -- where --, therefor.

At column 8, line 55 of Claim 5, please delete "message" and insert -- message an --, therefor.

At column 8, lines 66-67 of Claim 6, please delete "wherein where" and insert -- where --, therefor.

At column 9, line 8 of Claim 7, please delete "the" and insert -- the called --, therefor.

At column 9, line 13 of Claim 7, after "data to" delete "the" and insert -- the called --, therefor.

At column 9, line 21 of Claim 9, please delete "where" and insert -- where: --, therefor.

At column 9, line 31 of Claim 10, please delete "through" and insert -- through, --, therefor.

At column 9, line 42 of Claim 11, please delete "of 3" and insert -- 3 --, therefor.

At column 9, line 52 of Claim 12, please delete "port" and insert -- port of the device --, therefor.

At column 9, line 52 of Claim 12, please delete "through," and insert -- through the network, --, therefor.

At column 9, line 54 of Claim 12, please delete "port" and insert -- port of the device --, therefor.

At column 9, line 54 of Claim 12, please delete "from," and insert -- from the network, --, therefor.

UNITED STATES PATENT AND TRADEMARK OFFICE
CERTIFICATE OF CORRECTION

PATENT NO.        : 7,460,518 B1
APPLICATION NO. : 09/944481
DATED             : December 2, 2008
INVENTOR(S)       : Hussein Salama It is certified that error appears in the above-identified patent and that said Letters Patent is hereby corrected as shown below:

At column 9, line 58 of Claim 12, please delete "identify" and insert -- identifying --, therefor.

At column 10, line 11 of Claim 13, please delete "forthcomming" and insert -- forthcoming --, therefor.

At column 10, line 18 of Claim 15, after "that" delete "the" and insert -- the called --, therefor.

At column 10, line 20 of Claim 16, please delete "wherein" and insert -- where: --, therefor.

At column 10, line 25 of Claim 17, after "message to" delete "a" and insert -- a called --, therefor.

At column 10, line 28 of Claim 17, please delete "the" and insert -- the called --, therefor.

At column 10, line 31 of Claim 17, before "device" delete "the" and insert -- the called --, therefor.

At column 10, line 33 of Claim 17, after "data to" delete "the" and insert -- the called --, therefor.

At column 10, line 36 of Claim 17, please delete "the" and insert -- the called --, therefor.

At column 10, line 38 of Claim 17, please delete "the" and insert -- the called --, therefor.

At column 10, line 43 of Claim 19, after "message to" delete "a" and insert -- a called --, therefor.

At column 10, line 46 of Claim 19, please delete "the" and insert -- the called --, therefor.

At column 10, line 49 of Claim 19, before "device for" delete "the" and insert -- the called --, therefor.

UNITED STATES PATENT AND TRADEMARK OFFICE
CERTIFICATE OF CORRECTION

PATENT NO. : 7,460,518 B1
APPLICATION NO. : 09/944481
DATED : December 2, 2008
INVENTOR(S) : Hussein Salama It is certified that error appears in the above-identified patent and that said Letters Patent is hereby corrected as shown below:

At column 10, line 51 of Claim 19, after "data to" delete "the" and insert -- the called --, therefor.

At column 10, line 54 of Claim 19, please delete "forthcomming" and insert -- forthcoming --, therefor.

At column 10, line 56 of Claim 20, please delete "wherein" and insert -- where --, therefor.

At column 10, line 60 of Claim 21, please delete "wherein" and insert -- where: --, therefor.

At column 10, line 65 of Claim 22, after "from" delete "a" and insert -- a calling --, therefor.

At column 11, line 17 of Claim 24, after "from" delete "a" and insert -- a calling --, therefor.

At column 11, line 20 of Claim 24, please delete "port" and insert -- port of the device --, therefor.

At column 11, line 22 of Claim 24, please delete "port" and insert -- port of the device --, therefor.

At column 11, line 24 of Claim 24, please delete "the" and insert -- the calling --, therefor.

At column 11, line 28 of Claim 24, please delete "wherein where" and insert -- where --, therefor.

At column 11, line 34 of Claim 26, please delete "calling" and insert -- called --, therefor.

At column 11, line 35 of Claim 26, please delete "called" and insert -- calling --, therefor.

At column 11, line 37 of Claim 27, please delete "medium," and insert -- medium --, therefor.

UNITED STATES PATENT AND TRADEMARK OFFICE
CERTIFICATE OF CORRECTION

PATENT NO.        : 7,460,518 B1
APPLICATION NO. : 09/944481
DATED              : December 2, 2008
INVENTOR(S)       : Hussein Salama It is certified that error appears in the above-identified patent and that said Letters Patent is hereby corrected as shown below:

At column 11, line 43 of Claim 27, please delete "the" and insert -- the called --, therefor.

At column 11, line 45 of Claim 27, please delete "section;" and insert -- session; --, therefor.

At column 11, line 46 of Claim 27, please delete "an" and insert -- the --, therefor.

At column 11, line 48 of Claim 27, please delete "the" and insert -- the called --, therefor.

At column 11, line 55 of Claim 28, after "type of" delete "the" and insert -- the called --, therefor.

At column 11, line 59 of Claim 29, after "that" delete "the" and insert -- the called --, therefor.

At column 12, line 9 of Claim 31, after "data to" delete "the" and insert -- the called --, therefor.

At column 12, line 31 of Claim 33, please delete "the" and insert -- the called --, therefor.

At column 12, line 44 of Claim 36, please delete "medium," and insert -- medium --, therefor.

At column 12, line 57 of Claim 36, please delete "an-identify" and insert -- an --, therefor.

At column 12, line 58 of Claim 36, please delete "port" and insert -- port; --, therefor.

At column 12, line 62 of Claim 37, please delete "H-323" and insert -- H.323 --, therefor.

At column 12, line 62 of Claim 37, please delete "faststart" and insert -- fastStart --, therefor.

At column 12, line 65 of Claim 38, please delete "medium," and insert -- medium --, therefor.

UNITED STATES PATENT AND TRADEMARK OFFICE
CERTIFICATE OF CORRECTION

PATENT NO. : 7,460,518 B1
APPLICATION NO. : 09/944481
DATED : December 2, 2008
INVENTOR(S) : Hussein Salama It is certified that error appears in the above-identified patent and that said Letters Patent is hereby corrected as shown below:

At column 13, line 1 of Claim 38, please delete "a" and insert -- a calling --, therefor.

At column 13, line 3 of Claim 38, please delete "through" and insert -- through, --, therefor.

At column 13, line 7 of Claim 38, after "to" delete "the" and insert -- the calling --, therefor.

At column 13, line 38 of Claim 43, please delete "where" and insert -- where: --, therefor.

At column 13, line 58 of Claim 45, please delete "wherein where" and insert -- where --, therefor.

At column 14, line 33 of Claim 49, please delete "message" and insert -- message an --, therefor.

Signed and Sealed this

Fifth Day of May, 2009

JOHN DOLL
*Acting Director of the United States Patent and Trademark Office*